United States Patent [19]
Uchida et al.

[11] Patent Number: 5,410,694
[45] Date of Patent: Apr. 25, 1995

[54] FILE ACCESS PROCESSING SYSTEM OF A COMPUTER ENABLING HIGH-SPEED SEQUENTIAL ACCESS FOR A STREAM FILE

[75] Inventors: Hirofumi Uchida, Mishima; Atsushi Yamamoto, Fuji, both of Japan

[73] Assignee: Fujitsu Limited, Kawasaki, Japan

[21] Appl. No.: 222,333

[22] Filed: Apr. 4, 1994

Related U.S. Application Data

[63] Continuation of Ser. No. 711,880, Jun. 7, 1991, abandoned.

[30] Foreign Application Priority Data

Jun. 8, 1990 [JP] Japan ................................. 2-150601

[51] Int. Cl.6 .................... G06F 15/40; G06F 15/415
[52] U.S. Cl. .................................. 395/600; 395/425; 395/700; 364/243.2; 364/251; 364/280; 364/DIG. 1
[58] Field of Search ................. 395/425, 600, 700; 364/243.2, 251, 280

[56] References Cited

U.S. PATENT DOCUMENTS

| | | | |
|---|---|---|---|
| 5,008,820 | 4/1991 | Christopher, Jr. et al. | 364/200 |
| 5,021,995 | 6/1991 | Quint et al. | 395/600 |
| 5,115,490 | 5/1992 | Komuro et al. | 395/400 |
| 5,212,772 | 5/1993 | Masters | 395/200 |

OTHER PUBLICATIONS

Robert Jourdain, "Programmer's Problem Solver for the IBM PC, XT & AT", 1986, Ch. 5, pp. 241–326.

*Primary Examiner*—Kevin A. Kriess
*Assistant Examiner*—Dennis M. Butler

[57] ABSTRACT

In a file access processing system for executing sequential access for a copied file in a data processing device which includes a data processing unit and an access processing unit, and the data processing device being connected to an external storage device having a file management table and a copy file, the access processing unit includes: an access executing unit for executing an access to the file management table and the copy file in the external storage device; a setting unit for setting file organization information into the file management table, after the setting unit obtains the file organization information, which indicates whether the file is a record file or it is a stream file, by referring to the head information of the file when the copied file is first sequentially accessed; and a judgment unit for detecting whether the file is a record file or it is the stream file by referring to the file organization information set into the file management table of the file when the copied file is sequentially accessed; wherein, when the file is the stream file in accordance with the information detected by the judgment unit, the judgment is executed as the requested sequential access is the sequential access for the stream file, then the sequential access for the stream file is executed without referring to the head information of the stream file.

7 Claims, 7 Drawing Sheets

FILE ACCESS PROCESSING SYSTEM OF A COMPUTER ENABLING HIGH-SPEED SEQUENTIAL ACCESS FOR A STREAM FILE

This is a continuation of application Ser. No. 07/711,880, filed on Jun. 7 1991, now abandoned.

BACKGROUND OF THE INVENTION

1. Field of the Invention

The present invention relates to a file access processing system for a stream file when sequentially accessing a copied stream file, particularly, it relates to an access processing system enabling high speed sequential access for the stream file.

2. Description of the Related Art

In general, a file used in a data processing system can sort briefly a stream file (or regular file) and a record file. The former only has a structure of a byte permutation enabling random access and has no structural limitation besides the above. The latter is constituted by providing structures, such as a sequential organization, a relative organization, an indexed sequential organization, etc., on the stream file.

Further, in the record file, attribute information of that file is set into a head portion thereof. Meanwhile, in the stream file, no such attribute information is set into the head portion thereof since the stream file has no structural limitation. However, the stream file has the structures enabling a record access and enabling for the sequential access for data of the file. Accordingly, it is necessary to provide means for enabling high speed access when executing the sequential access to the stream file having such a structure.

SUMMARY OF THE INVENTION

The object of the present invention lies in a provision of an access processing system enabling high speed sequential access processing for the stream file when sequentially accessing thereto.

In accordance with the present invention, there is provided a file access processing system for executing sequential access for a copied file in a data processing device which includes a data processing unit and an access processing unit, and the data processing device being connected to an external storage device having a file management table and a copy file, the access processing unit includes:

an access executing unit for executing an access to the file management table and the copy file in the external storage device;

a setting unit for setting file organization information into the file management table, after the setting unit obtains the file organization information, which indicates either the file is a record file or it is a stream file, by referring head information of the file when the copied file is first sequentially accessed; and a judgment unit for detecting whether the file is the record file or it is the stream file by referring the file organization information set into the file management table of the file when the copied file is sequentially accessed;

wherein, when the file is the stream file in accordance with the information detected by the judgment unit, the judgment executed as the requested sequential access is the sequential access for the stream file, then the sequential access for the stream file is executed without referring to head information of the stream file.

In a preferred embodiment, the file management table comprises a space information section storing a file name, a file size, etc., and a file organization information section storing either the stream file or the record file.

BRIEF DESCRIPTION OF THE DRAWINGS

FIG. 2 shows how FIGS. 2A and 2B are combined to form a flowchart.

FIGS. 2A and 2B are flowcharts at file opening processing in the access processing unit shown in FIG. 1;

DESCRIPTION OF THE PREFERRED EMBODIMENTS

Before describing the preferred embodiments, an explanation will be given of a conventional art.

When executing a record access for a file, it is necessary to clarify whether an access request is a record access for a stream file or it is a record access for a record file. This is necessary for executing the record access. Accordingly, file organization information, which indicates either the stream file or the record file, is set into a file management table which is provided in the external storage device.

In this case, when copying the file by using the stream file, only data in the file is transferred and copied, and it is impossible to copy the data of the file management table since the data in the file is separately provided from the data of the file management table.

As explained above, in a conventional art, when sequentially accessing the copied file in accordance with the record access, the head portion of the file is searched to detect whether the file to be accessed is the stream file or the record file. That is, when the attribute information is set into the head portion of the file, the copied file, which is the object of the access, is determined as the record file, and the sequential access is executed in accordance with the attribute information of the file. Contrary, when the attribute information is not set into the head portion of the file, the copied file is determined as the stream file and the sequential access is executed in accordance with the stream file.

There is, however, a problem regarding such an access in the above conventional art. That is, it is difficult to execute high speed access processing because when sequentially accessing the copied stream file, it is necessary to search the head portion of the stream file to determine whether it is the stream file itself.

Accordingly, the object of the present invention lies in an access processing system enabling high speed sequential access when sequentially accessing the copied file.

Figure 1:
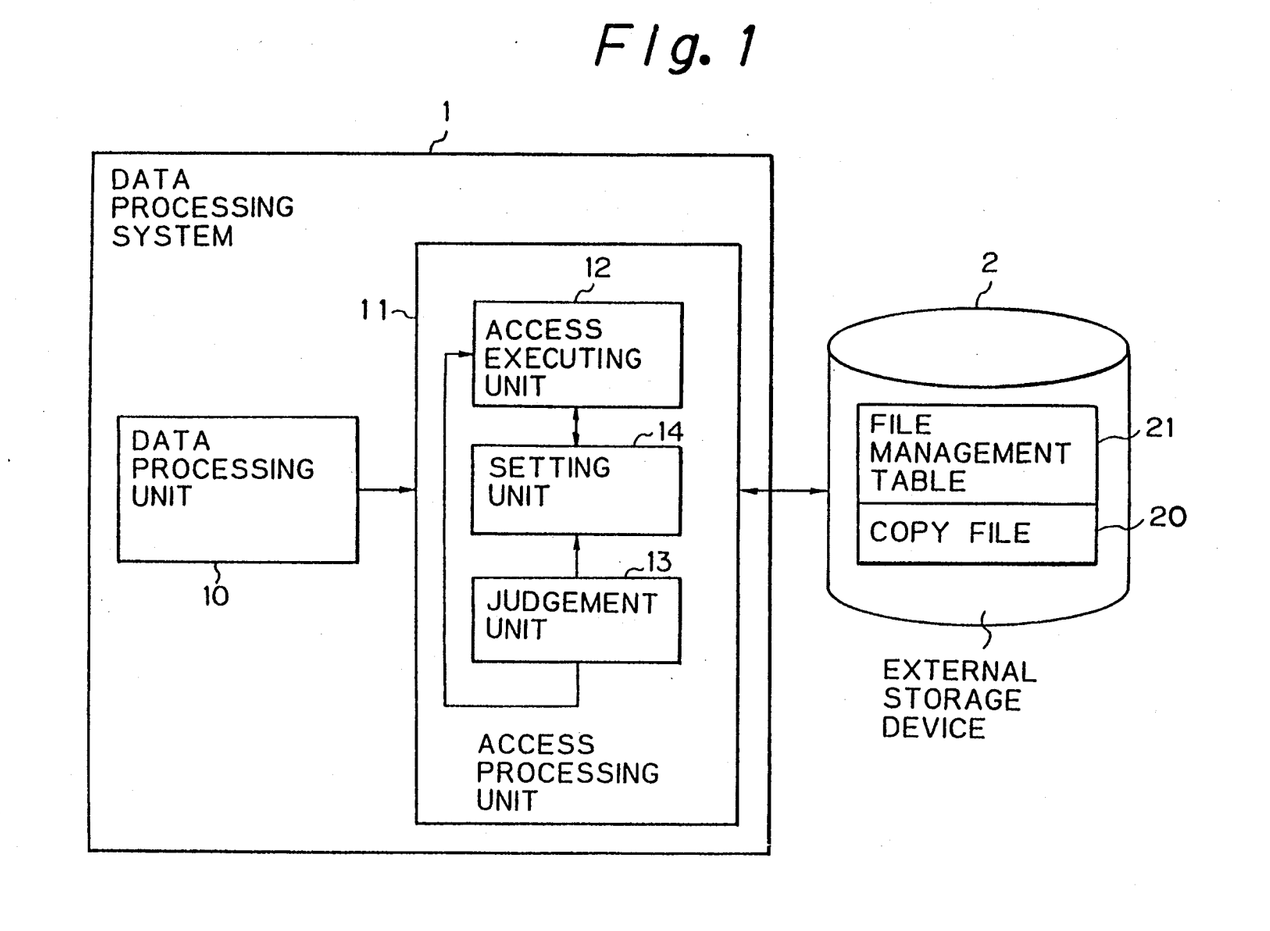
FIG. 1 is a schematic block diagram of a data processing system including a file access processing system according to the present invention.

FIG. 1 is a schematic block diagram of a data processing system including a file access processing system according to the present invention. In FIG. 1, reference number 1 denotes a data processing device constituted by, at least one central processing unit and memory, and reference number 2 denotes an external storage device constituted by, for example, a magnetic disk device. As a functional expression, the data processing device 1 includes a data processing unit 10 for executing the processing operation of data (below, data processing) based on an application program and an access processing unit 11 for executing the processing operation for an access (below, access processing) to the external storage device 2. Further, the external storage device 2 includes a copied file 20 (below, copy file) and a file management table 21 for storing and managing space information of the copy file 20.

As shown in the drawing, the access processing unit 11 includes an access executing unit 12, a judgment unit 13, and a setting unit 14. The access executing unit 12 executes the access processing to the original file and the copy file 20 stored in the external storage unit 2. When the sequential access is requested from the data processing unit 10 to the copy file 20, the judgment unit 13 detects whether or not the file organization information is set into the file management table 21. In this case, the file organization information indicates that the copy file 20 is either the record file or the stream file.

Further, when the sequential access is requested from the data processing unit 10 to the copy file 20, in the case that the file organization information is not set into the file management table 21, the setting unit 14 refers to the head portion of the copy file 20 in accordance with the information of the access executing unit 12, and obtains information to determine whether the copy file 20 is the record file or the stream file. Further, the setting unit 14 sets the obtained file organization information into the file management table 21.

In the present invention, when the sequential access is requested from the data processing unit 10 to the copy file 20, the judgment unit 13 refers to the file management table 21 of the copy file 20, and detects whether or not the file organization information of the copy file 20 is set into the file management table 21. At the time when the copy file 20 is generated, only the space information is set into the file management table 21. Accordingly, at the first time of the request of the sequential access from the data processing unit 10 to the copy file 20, the file organization information is not set into the file management table 21.

When the judgment unit 13 determines that the file organization information is not set into the file management table 21, the setting unit 14 obtains the file organization information and sets it into the file management table 21. In accordance with the processing operation at the setting unit 14, after the first request of the sequential access from the data processing unit 10 to the copy file 20, the judgment unit 13 can detect the fact that the file organization information of the copy file 20 is already set into the file management table 21. Accordingly, in accordance with this file organization information, the judgement unit 13 detects whether the copy file 20 to be accessed is the record file or it is the stream file.

When the judgment unit 13 determines that the copy file 20 is the stream file, the access executing unit 12 executes the sequential access to the copy file 20 of the stream file without referring to the head portion of the copy file 20.

As explained above, in the present invention, after the first request of the sequential access to the copied stream file, it is possible to immediately execute the sequential access processing without referring to the head information of the stream file so that it is possible to realize high speed sequential access for the stream file.

Figures 2, 2A:
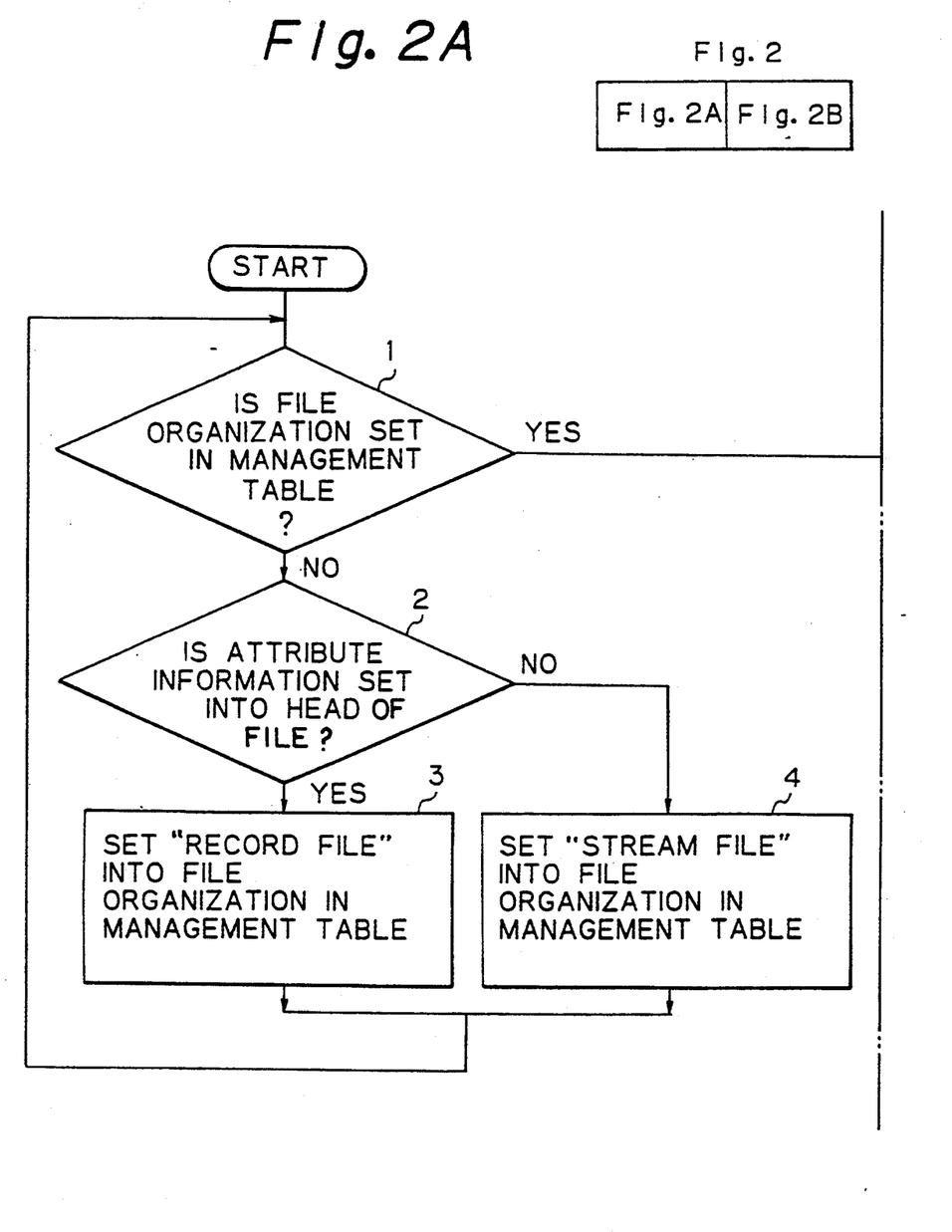
Figure 2B:
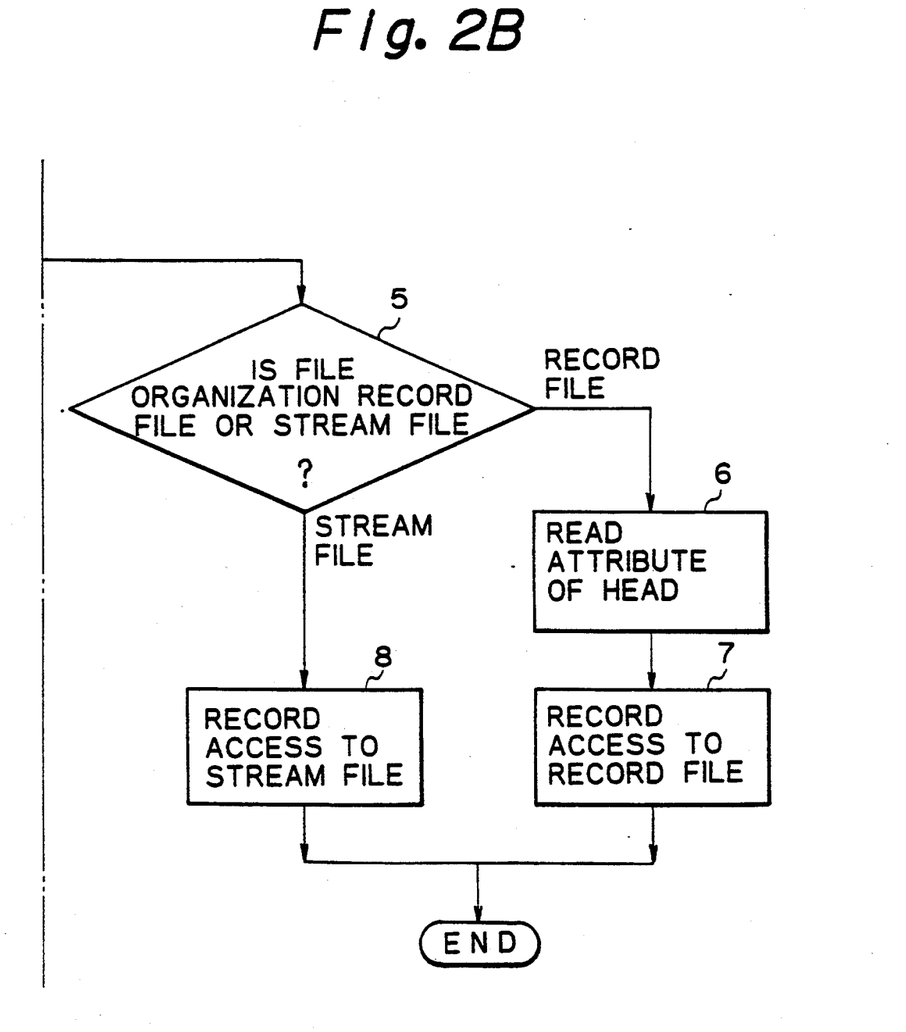
Figure 3A:
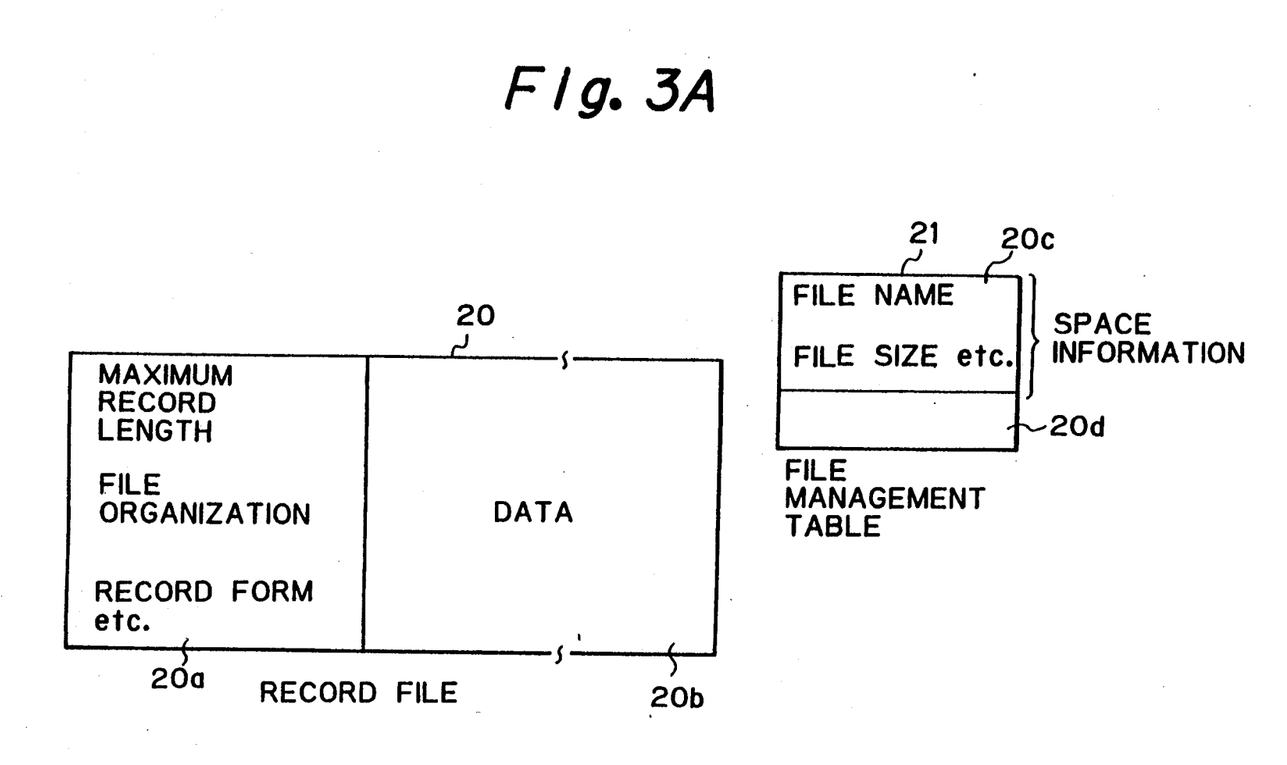
FIGS. 3A and 3B are views for explaining management data in a management table of a copied file.
Figure 3B:
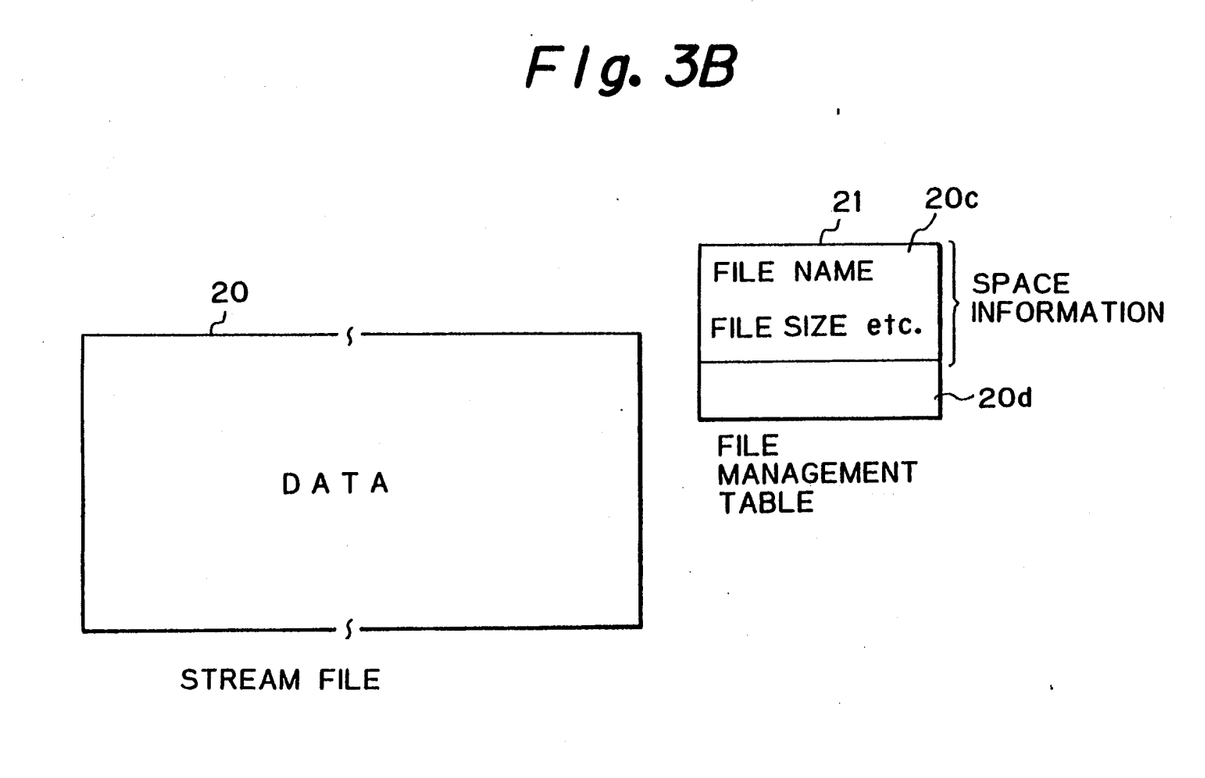
Figure 4A:
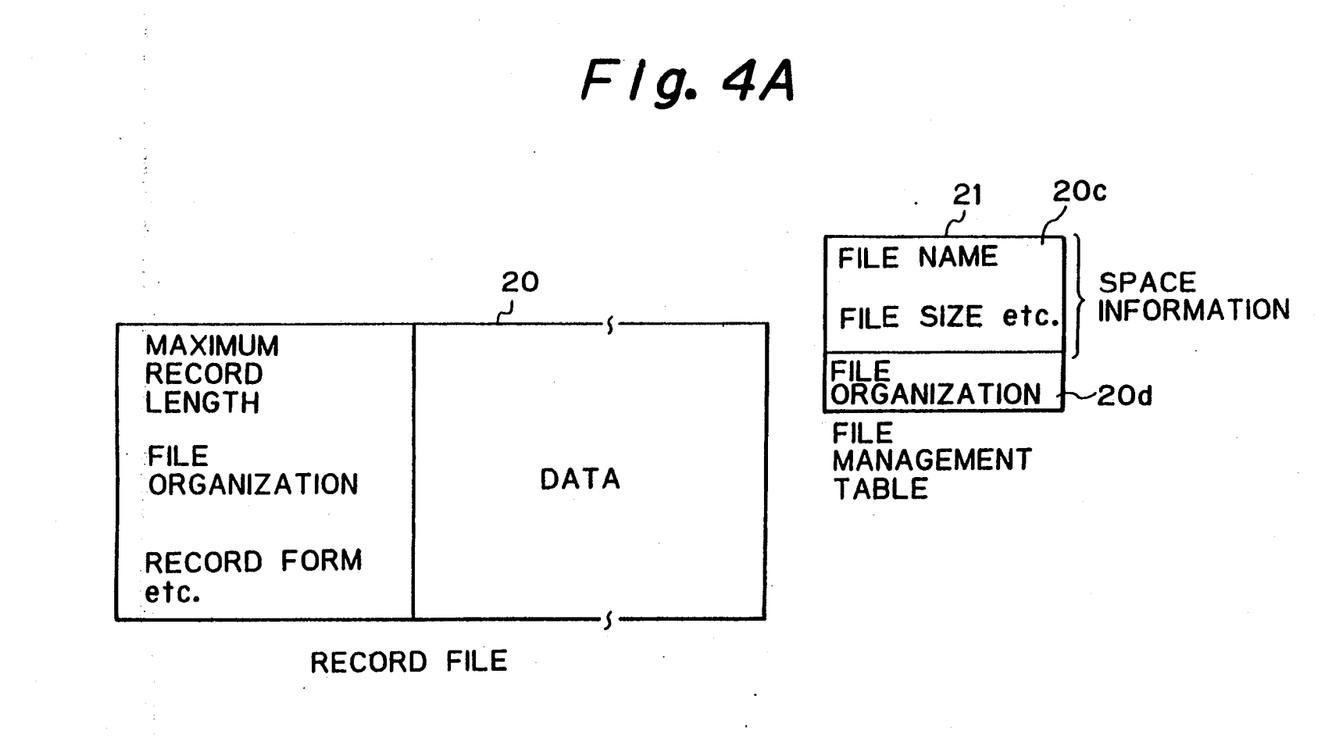
FIGS. 4A and 4B are views for explaining processing operation according to the present invention.
Figure 4B:
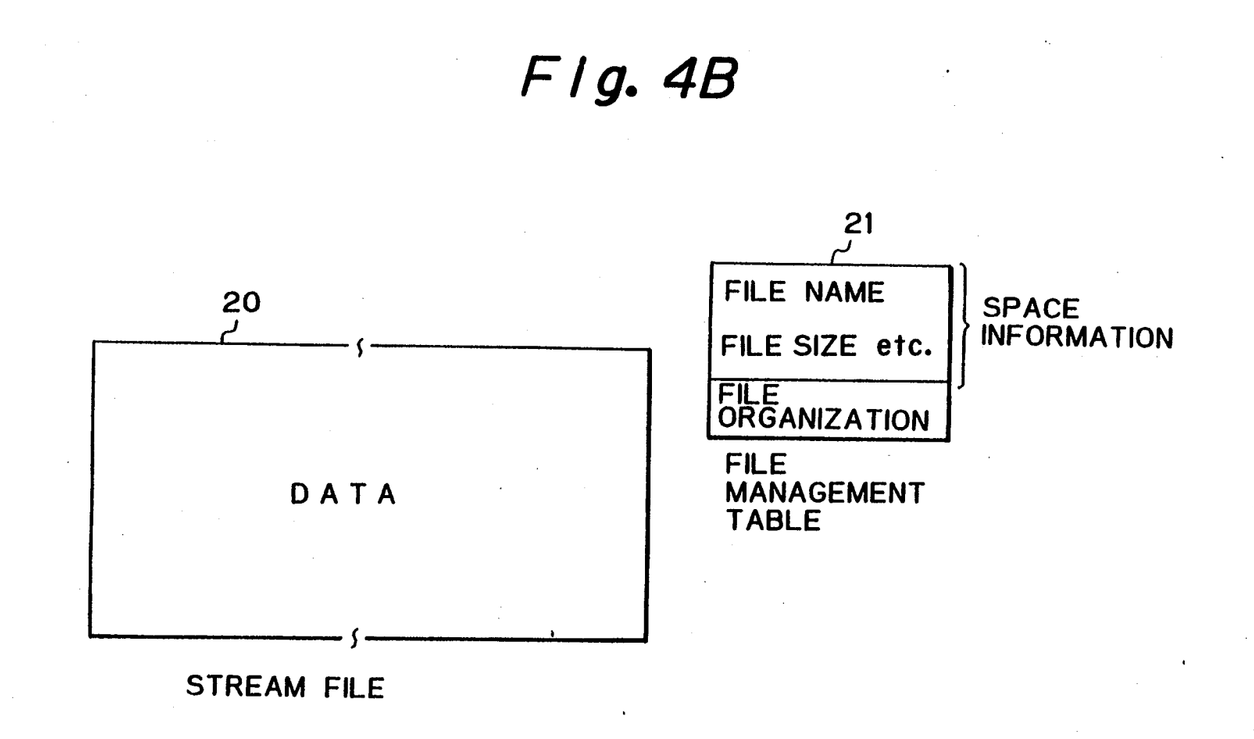

FIG. 2 is a flowchart at a file opening processing in the access processing unit shown in FIG. 1. FIGS. 3A and 3B are views for explaining management data in a management table of a copied file, and FIGS. 4A and 4B are views for explaining the processing operation according to the present invention. The operations of the present invention are explained in detail below.

In FIG. 2, when an application program in the data processing unit 10 requests the opening of a file to the access processing unit 11, first, the access processing unit 11 determines whether or not the file organization information is set in the file management table 21 of the file which is the object of the opening (step 1). As explained above, when the file which is the object of the access is the copied file and regardless of whether the copy file is the record file or it is the stream file, the file organization information is not set into the file management table 21.

In FIG. 3A, the record file 20 has an attribute information section 20a and a data section 20b. The attribute information section 20a is available to the head of the record file 20 for accessing the attribute information. The attribute information is constituted by a maximum record length, a file organization, a record form, etc. The maximum record length indicates the maximum record length possible for one access, the record form indicates a fixed length and a variable length, and the file organization is explained in detail herein after. The file management table 21 has a space information 20c including a file name, a file size, etc., used as management data. The space 20d is used for storing the attribute information data.

In FIG. 3B, the stream file 20 is constituted by only a data section and has no attribute information section in the head thereof. The space 20d of the file management table 21 is vacant in the case of the stream file.

When the copy file 20 is generated, the file management table 21 which manages the space information of the copy file 20 is automatically generated. However, when the data of the file is copied by using the stream access, the file organization information, which is already set into the file management table of the original file, is not copied in the file management table 21.

When the file organization information is not set into the file management table (NO, in step 1), the judgment is executed as to whether or not the attribute information to be accessed is set into the head portion of the copy file 20 to be accessed (step 2).

When the copy file 20 is the record file, the attribute information for the access is set into the head portion thereof. When the copy file 20 is the stream file, the attribute information for the access is not set into the file. Accordingly, based on the processing operation of this step 2, it is possible to detect whether the copy file 20 to be accessed is the record file or it is the stream file.

In the step 2, when the attribute information is set into the head portion of the file (YES), i.e., when the copy file 20 to be accessed is the record file, the data indicating "record file" is set into the file organization information section 20d in the file management table 21 (step 3).

When the attribute information is not set into the head portion (NO, in step 2), i.e., when the copy file 20 to be accessed is the stream file, the data indicating "stream file" is set into the file organization information section 20d in the file management table (step 4).

As shown in FIGS. 4A and 4B, after completion of the steps 1 to 4, the file organization information, which indicates whether the copy file is the record file or the stream file, is set into the file organization information section 20d. In FIG. 4A, the file organization information is set into the section 20d of the record file. In FIG. 4B, the file organization information is set into section 20d of the stream file.

In the present invention, when the copy file 20 is first opened, the file organization information, which indicates whether the copy file 20 is the record file or the stream file, is set into the file organization section of the file management table 21.

Accordingly, when the file organization information is set into the file management table 21, on and after the second opening of the copy file 20, it is easy to discern that the file organization information is set into the file management table 21.

When the file organization information is set into the file management table 21 (YES, in step 1), a judgment is performed to determine whether the file organization information indicates the record file or the stream file (step 5). When the file organization information indicates the record file (YES, in step 5), the attribute information for the access is read out from the head portion of the file (step 6). Further, in accordance with the attribute information obtained from the head, the record access is executed for the copy file 20 which is the record file to be accessed (step 7).

When the file organization information indicates the stream file (NO, in step 5), the attribute information for the access is not set into the head portion of the file, the record access is executed to the copy file 20, which is the stream file to be accessed, without referring the head portion.

Accordingly, on and after the second sequential access for the copied stream file, it is possible to immediately execute the sequential access without referring to the head portion of the stream file so that it is possible to realize high speed sequential access for the stream file.

What is claimed is:

1. A file access processing system of a computer for executing sequential access for a file with head information in a data processing device including data processing means for processing data, access processing means for accessing the file and an external storage device, having a file management table and a copy of the file, connected to said data processing device, said access processing means comprising:

access executing means of the computer for accessing the file management table and the copy of the file in the external storage device;

setting means of the computer for setting file organization information in the file management table, after said setting means obtains the file organization information, which indicates whether the copy of the file is one of a record file and a stream file, by referring to the head information of the copy of the file when the copy of the file is first sequentially accessed by the data processing means, the head information containing attribute information only if the copy of the file is a record file; and judgement means of the computer for detecting whether the copy of the file is one of the record file and the stream file by referring to the file organization information set in the file management table, which indicates that the copy of the file is a record file if the head information of the copy of the file contains attribute information, when the copy of the file is sequentially accessed by the data processing means and, when the copy of the file is the stream file according to the file organization information detected by said judgement means, executing the sequential access by the data processing means from the external storage device for the stream file without referring to the head information of the stream file.

2. A file access processing system of a computer as claimed in claim 1, wherein the file management table comprises a space information section storing a file name, a file size, and a file organization information selection storing one of the stream file and the record file.

3. A file access processing system of a computer for processing a file which is one of a record file having head information and a stream file having head information, comprising:

external storage means for storing a file and for managing file organization information, including attribute information if the file is the record file; and data processing means of the computer for accessing the file organization information, for setting the file organization information in said external storage means responsive to whether the file organization information was previously stored and the file has the head information, for sequentially accessing the file based on the file organization information, said file being accessed as the record file by reading the head information of the file only if the file organization information contains attribute information for the file, and being accessed as the stream file, from the external storage means, without accessing the head information of the file otherwise.

4. A computer-implemented file access processing method for processing a file which is one of a record file having head information and a stream file having head information, comprising the steps of:

a) storing a file;
   b) managing file organization information which indicates whether the file is the record file or the stream file and which is stored in a file table;
   c) accessing the file organization information stored in the file table;
   d) setting the file organization information when the file table is empty; and
   e) sequentially, and directly, accessing the file without accessing the head information when the file is the stream file and the file organization information is set in the file table.

5. A computer-implemented file access processing method as recited in claim 4, further comprising the step of:

f) accessing the file by reading the head information when the file is the record file.

6. A computer implemented file access processing method as recited in claim 4, wherein step c) includes the substep of:

c1) setting the file organization information in the file table to indicate the record file when the file is the record file.

7. A computer-implemented file accessing processing method as recited in claim 4, wherein step c) includes the substep of:

c2) setting the file organization information in the file table to indicate the stream file when the file is the stream file and the file organization information indicates otherwise.

* * * * *

UNITED STATES PATENT AND TRADEMARK OFFICE
CERTIFICATE OF CORRECTION

PATENT NO. : 5,410,694

DATED : April 25, 1995

INVENTOR(S) : Hirofumi UCHIDA et al.

It is certified that error appears in the above-indentified patent and that said Letters Patent is hereby corrected as shown below:

Col. 3, line 55, delete "it".

Signed and Sealed this

Seventeenth Day of October, 1995

Attest:

BRUCE LEHMAN

*Attesting Officer*   *Commissioner of Patents and Trademarks*